Oct. 27, 1931.    H. M. KINGSLEY    1,828,841
FOUR-WHEEL DRIVE VEHICLE CONSTRUCTION
Filed July 7, 1928    7 Sheets-Sheet 1

INVENTOR.
HENRY M. KINGSLEY.
BY
ATTORNEYS.

Oct. 27, 1931. H. M. KINGSLEY 1,828,841
FOUR-WHEEL DRIVE VEHICLE CONSTRUCTION
Filed July 7, 1928 7 Sheets-Sheet 2

INVENTOR.
HENRY M. KINGSLEY
BY
ATTORNEYS.

Oct. 27, 1931.  H. M. KINGSLEY  1,828,841
FOUR-WHEEL DRIVE VEHICLE CONSTRUCTION
Filed July 7, 1928  7 Sheets-Sheet 6

INVENTOR.
HENRY M. KINGSLEY.
BY
ATTORNEYS.

Oct. 27, 1931.   H. M. KINGSLEY   1,828,841
FOUR-WHEEL DRIVE VEHICLE CONSTRUCTION
Filed July 7, 1928   7 Sheets-Sheet 7

INVENTOR.
HENRY M. KINGSLEY.
BY
ATTORNEYS.

Patented Oct. 27, 1931

1,828,841

UNITED STATES PATENT OFFICE

HENRY M. KINGSLEY, OF INDIANAPOLIS, INDIANA, ASSIGNOR, BY MESNE ASSIGNMENTS, TO AUTOMOTIVE DEVELOPMENT CORPORATION, OF DOVER, DELAWARE

FOUR WHEEL DRIVE VEHICLE CONSTRUCTION

Application filed July 7, 1928. Serial No. 290,937.

This invention relates to the construction of a motor truck or tractor, and particularly in respect to that type wherein the driving power is applied to all four wheels or driving units.

The principal object of the invention is to construct a truck or tractor of the above character which will be of simple and light construction as well as efficient and flexible for meeting the many service requirements of vehicles of this kind.

The principal feature of the invention resides in the driving connection between the front and rear wheels such that the rear wheels only will be normally driven while the front wheels will be driven when conditions are such as to cause the driving efficiency of the rear wheels to fall below the maximum. Thereupon, the driving power will be transmitted directly to the front wheels which will take hold and drive the truck either independently of the rear wheels or in conjunction therewith. This permits of a flexibility which is not present in four-wheel drive vehicles wherein the front and rear wheels are both positively driven at all times. Thus, whereas the normal driving action of the vehicle is from the rear wheels in the usual manner, in event there is any slippage of the rear wheels due to an obstruction, miring or wet pavement, the front wheels will immediately take hold and pull the vehicle forward until the rear wheels have again taken hold with maximum driving efficiency. This flexibility permits of free action in going around corners or backing up without the necessity of providing differentials on both axles, and the complicating mechanism necessary therefor.

The second feature of the invention resides in the adjustment of the jack shaft thrust bearings, as will be hereinafter more fully set forth and described.

A third feature of the invention resides in the torque rod swivel connections with the rear axle to permit of maximum flexibility.

Still another feature of the invention resides in the swivel connections of the rear springs upon the axle.

A further feature of the invention resides in the tension adjustment for the driving chains wherein chains are employed in place of driving shafts, and another feature resides in the cam actuating mechanism for the service brake applied to the main drive shaft.

The full nature of the invention will be more clearly understood from the accompanying drawings and the following description and claims.

Figure 1:
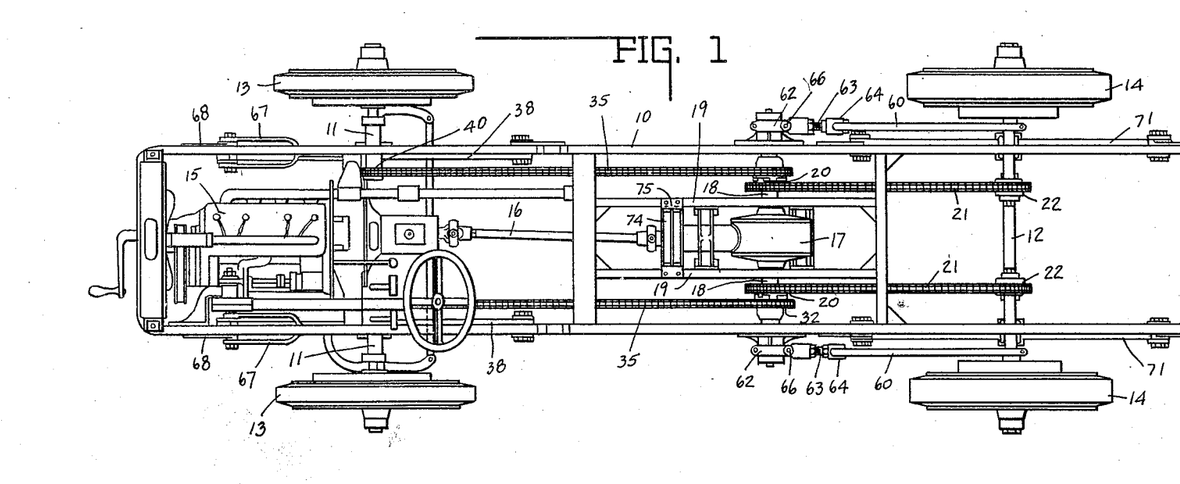
Fig. 1 is a plan view of the chassis.
Figure 2:
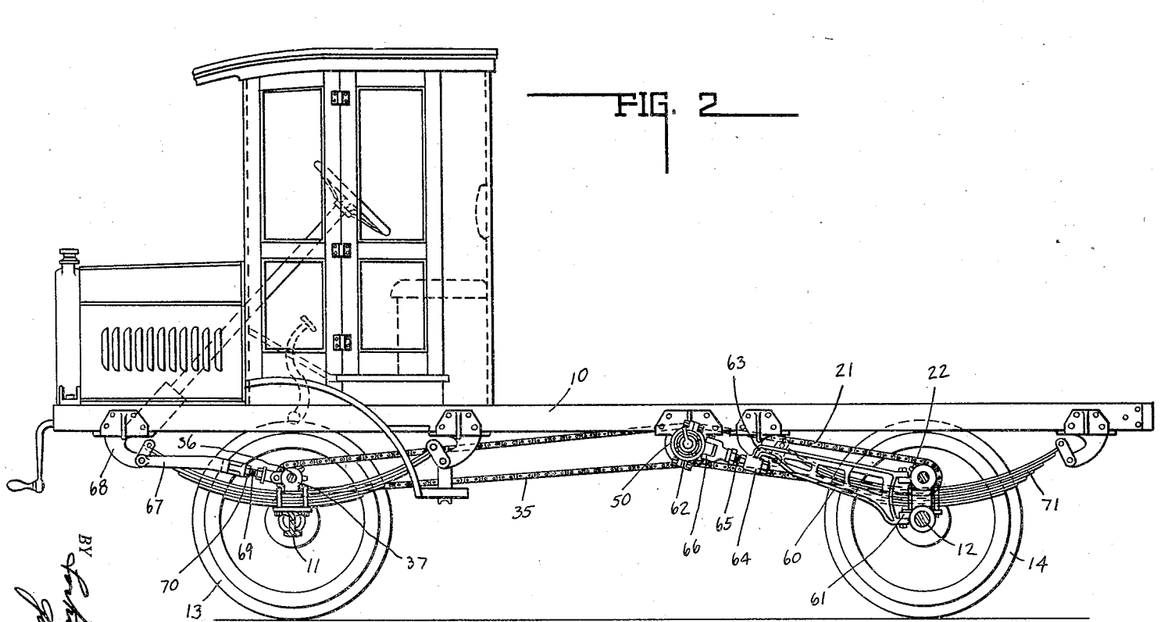
Fig. 2 is a side elevation thereof with parts broken away.

In the drawings there is shown a motor driven truck having a frame 10 mounted and carried upon the front axle 11 and rear axle 12, the front axle carrying the front driving wheels 13 and the rear axle carrying the rear driving wheels 14.

The vehicle is driven from the motor 15 through the main drive shaft 16 and differential gearing contained in the differential housing 17. The differential gearing is of the conventional type driving from each side thereof the stub shafts 18. As shown herein, the differential is mounted on the vehicle frame intermediate the front and rear axles as distinguished from the usual mounting thereof upon the rear axle.

Keyed to the stub shafts which have their bearings in the auxiliary frame supports 19 and the main frame 10, there are driving sprocket wheels 20 which drive the sprocket chains 21 extending to the rear axle, said sprocket chains 21 driving the sprockets 22 keyed to the driving shaft 23 which is mounted in the housing 24 supported by said rear axle 12. The shaft 23 drives the pinion 25 which is so positioned as to engage and mesh with the internal driving gear 26 secured to one of the rear wheels 14. The other rear driving chain 21 drives the other rear wheel through the same character of mechanism. From the foregoing, it will be noted that through the sprocket chains 21 the rear wheels will be driven in the usual manner from the differential.

Figure 5:
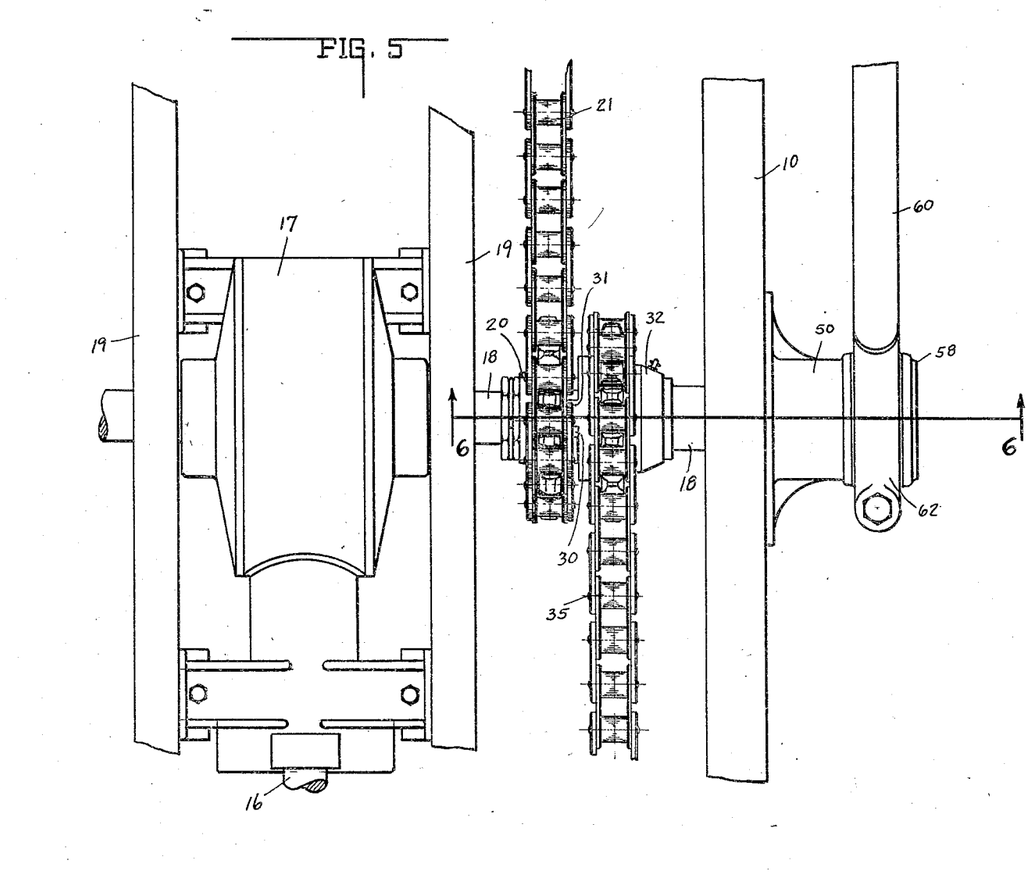
Fig. 5 is an enlarged plan view of the driving connection between the front and rear driving chains.
Figure 6:
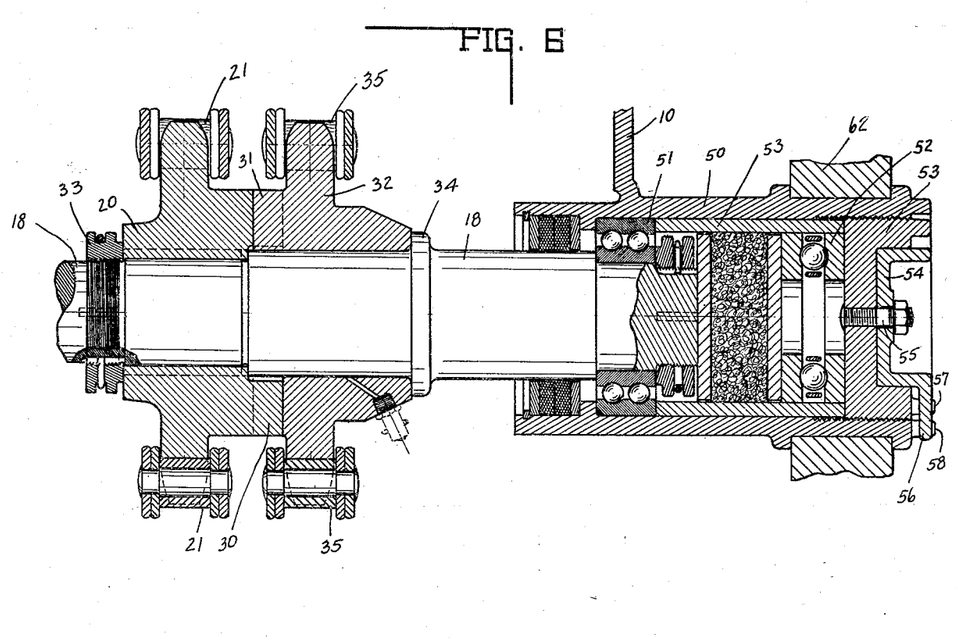
Fig. 6 is an enlarged sectional view of the driving connection between the front and rear driving chains and the jack shaft end-thrust bearing.
Figure 7:
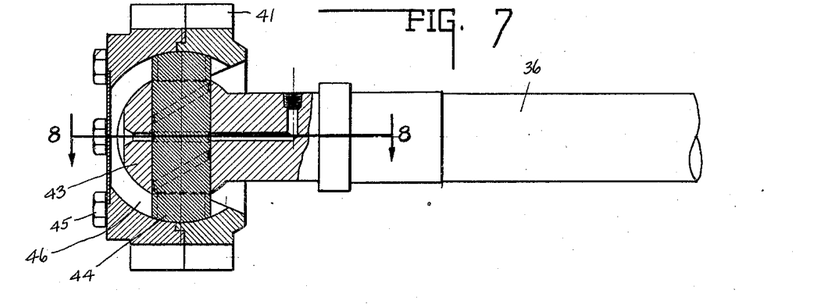
Fig. 7 is a sectional view of the universal connection between the front drive shaft and the driving pinion.
Figure 8:
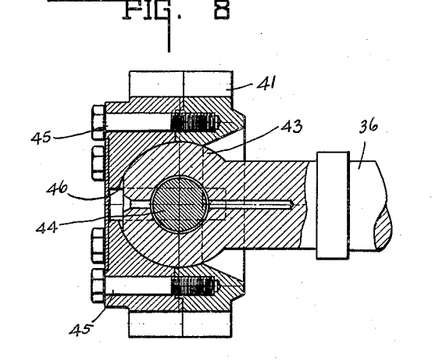
Fig. 8 is a section taken on the line 8—8 of Fig. 7.
Figure 9:
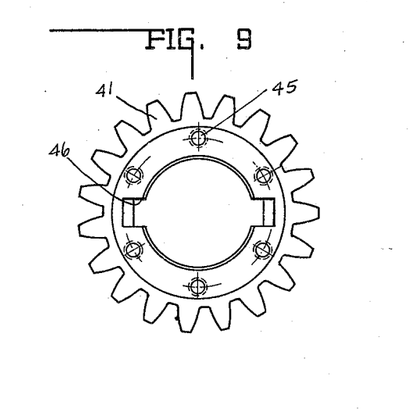
Fig. 9 is a front elevation of the driving sprocket.
Figure 10:
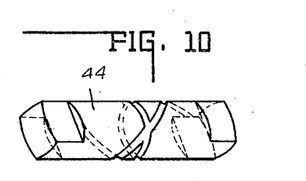
Fig. 10 is a perspective view of the driving pin.

For providing a front wheel drive connection, the sprockets 20 are provided with a pair of diametrically opposed outwardly extending lugs 30 so positioned as to engage with corresponding inwardly extending lugs 31 mounted on the front wheel drive sprockets 32. The latter are rotatably mounted upon the shafts 18 so that their only driving connection is through the sprockets 20. Said sprockets 20 and 32 are held in interlocking engagement between their respective retaining nut 33 and shoulder 34. The sprockets 32 are adapted to drive the chains 35 which extend forwardly to the front driving mechanism.

Figure 3:
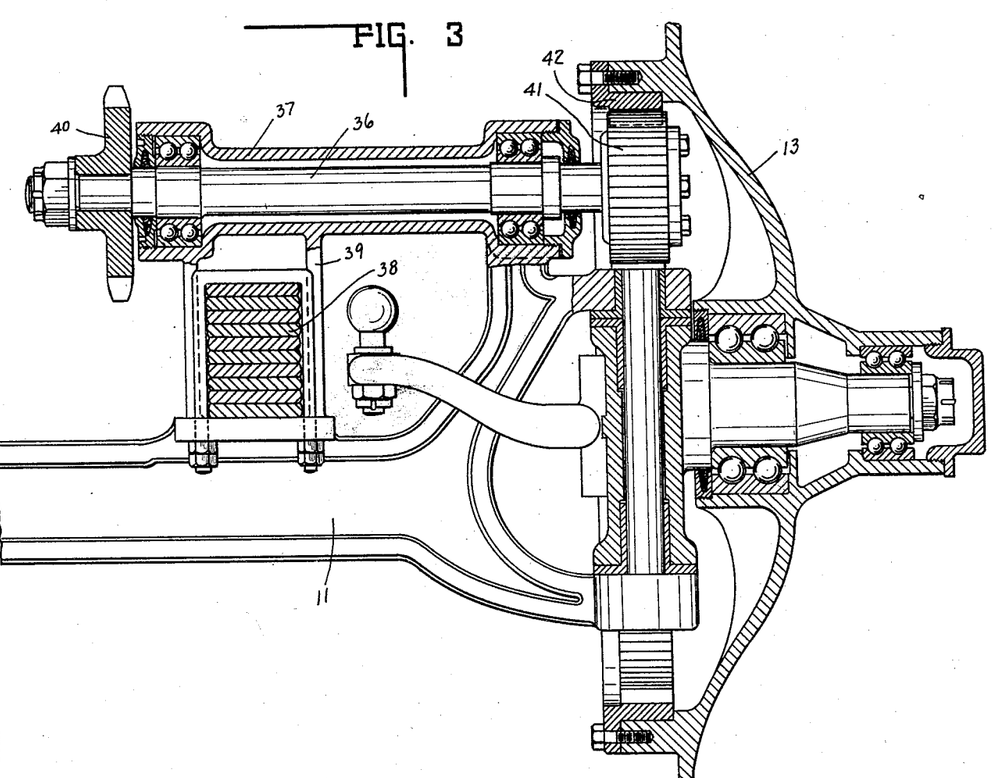
Fig. 3 is an enlarged view of one end of the front axle showing a section through the hub of the front wheel and the front driving mechanism.

The front driving mechanism comprises the shaft 36 mounted in suitable bearings within the housing 37 which housing is supported above the front vehicle springs 38 upon the front axle 11 by the supports 39.

The inner end of the shaft 36 carries a sprocket wheel 40 keyed thereto adapted to receive and be driven by the sprocket chain 35. The other end thereof has a ball and socket driving connection with the pinion 41 adapted to mesh with the internal gear 42 mounted on the front wheel 13.

The ball and socket connection, as shown in Figs. 7 to 10, inclusive, comprises a substantially spherical head 43 formed on the end of the shaft 36 and having a driving pin 44 extending diametrically therethrough. The pinion 41 is formed in two parts secured together by the bolts 45 and has a spherical recess which embraces the head 43. The spherical recess of the pinion is provided with a slot 46 for receiving the ends of the pin 44 protruding from the head. Thus, while the pinion 41 is driven by the shaft 36, it is free to swing transversely of the axis therethrough to accommodate itself to the turning of the front steering wheels 13 as well as accommodate itself to varying conditions of wear and flexing.

From the foregoing it will be noted that in operation, the vehicle motor will normally drive the vehicle through the rear wheels. This will cause the front wheels to move in accord therewith so that the lugs 30 and 31 will rotate with each other either in spaced relation or without any perceptible action therebetween. In other words, they will move freely and independently of each other. This free and relative movement between the lugs 30 and 31 will extend throughout substantially a half revolution of their respective sprockets, thus permitting of the usual variations in traction between the front and rear wheels in turning corners, backing, etc. Such free play will extend throughout approximately one hundred seventy degrees, depending upon the thickness of the lugs. However, in event the rear wheels meet with any obstruction, become mired, or in any other way are caused to slip or rotate without imparting a corresponding driving action to the vehicle and front wheels, the lugs 30 will be brought into engagement with the lugs 31 so that the front wheels will be driven through the inner engagement between the sprockets 20 and 32 independently of any action of the rear wheels. Under such circumstances, the front wheels of the truck will pull it over the obstacle or out of the condition under which the efficiency of the rear wheels is lost. The front wheels will then drive the truck until such time as the relative positions of the sprocket wheels become such that the lugs 30 and 31 are disengaged. The same will be true in a reverse action in backing up, the lugs 30 and 31 engaging on the opposite sides thereof.

As shown in Fig. 6, the frame 10 is provided with a bearing support 50 for the ends of the jack shafts 18. Said support carries the bearings 51 and end-thrust bearings 52. The end-thrust bearings are locked in place and held by the adjusting nut 53 in the end of the housing 50, which nut is provided with a lock 54 pivotally secured thereon by the bolt 55 and locked in position by the projection 56 engaging between the projections 57 extending outwardly from the nut and the projections 58 extending outwardly from the housing 50. By means of this arrangement, a minute adjustment of the end-thrust bearing may be effected through the nut 53 by varying the length of the spacing sleeve 53', and said nut may be positively locked in any adjusted position by the locking member 54, since an opening to receive the projection 56 thereof will be provided between the projections 57 and 58 at some position in the rotation of the adjusting nut.

Figure 4:
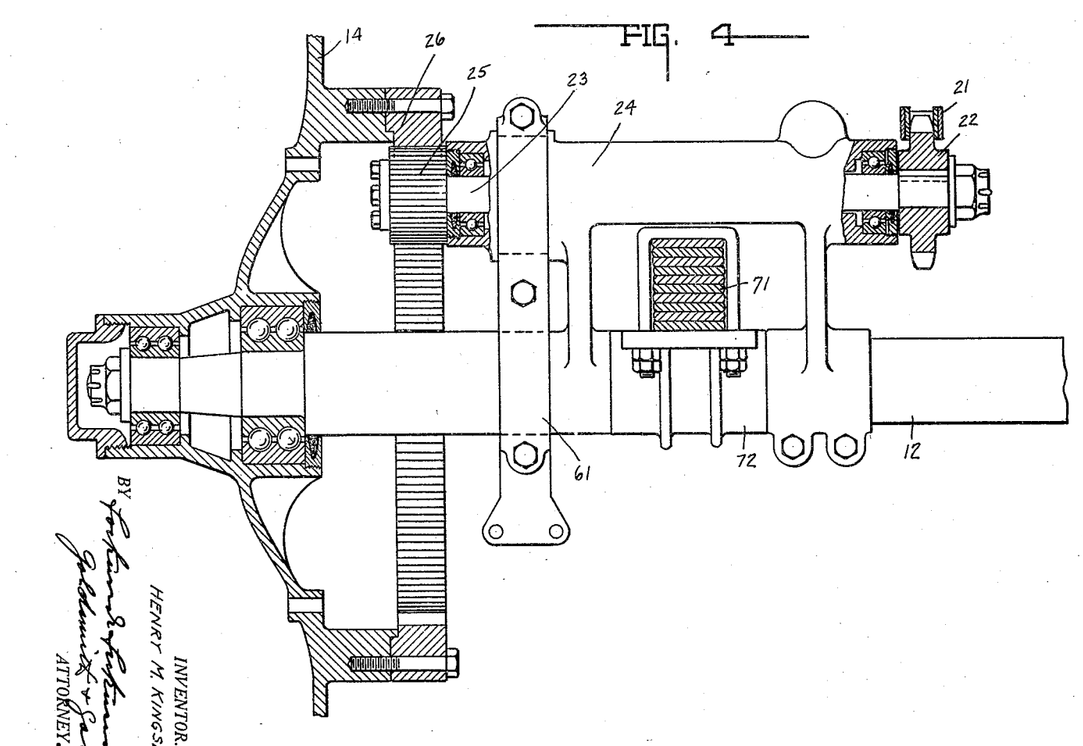
Fig. 4 is a view of a portion of the rear axle mounting.

The torque rods 60 are pivotally mounted at 61 on the rear axle and on the housing 51 at 62. Said torque rod includes a frame-like member having a neck 63 provided with the cylindrical barrel 64 through which the bolt 65 extends, said bolt being pivotally mounted at 66 to the collar 62. Thus, a free movement is permitted between the torque rod and its connections about an axis extending diametrically thereof as well as an axis extending longitudinally thereof. By adjusting the bolt 63 in the barrel 64 of the torque rod, the position of the rear axle with respect to the frame may be varied for adjusting the tension of the driving chains 21, and the swivel connection will accommodate the axle and frame to the action of the rear springs.

The torque rods for the front axle also act as an adjustment for taking up slack in the front driving chains 35. As shown in Fig. 2, the front torque rods 67 have their front ends secured to the spring shackle brackets 68 and their rear ends connected with the housings 37 for the front drive shafts 36. Included in said torque rods there are screw threaded adjustments 69 which are locked by the lock nuts 70 which permit of longitudinal adjustment of said torque rods. While the torque rods act to hold and steady the front axle with respect to the frame, the longitudinal adjustment thereof controls the slack in the front driving chains by moving the front axle forwardly or rearwardly, which movement will be compensated for by the spring shackles.

As illustrated in Fig. 4, the rear springs 71 are securely clipped to sleeves 72, which sleeves surround the axle 12 so as to swivel thereon and permit of more flexibility of said rear axle in conjunction with the swivally connected rear torque rods 60.

Figure 11:
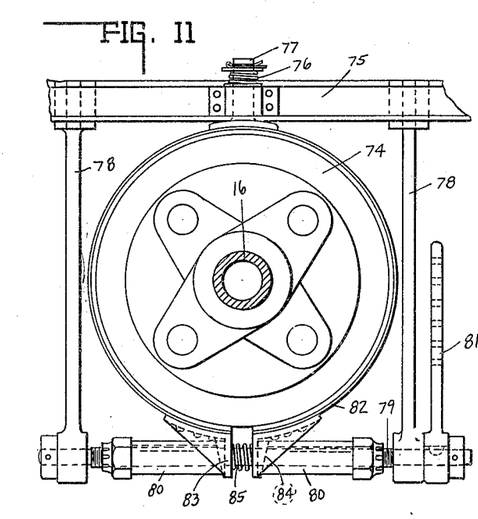
Fig. 11 is an enlarged view of the brake on the drive shaft.

The brake 74 mounted upon the drive shaft 16, as shown in Fig. 11, is suspended from the cross bar 75 by the compression spring 76 surrounding the pin 77 extending therethrough, whereby the brake may readily flex with the action of the drive shaft. Depending from the cross bar 75 there are supporting rods 78 on each side of the brake having a shaft 79 extending through their lower ends upon which the sleeves 80 are keyed. Said shaft is rotated in the bearing supports of the rods 78 by the brake lever 81. The brake shoe 82 has secured thereto, adjacent its split free ends, the cam members 83 which are provided with cam surfaces as indicated at 84 adapted to engage with corresponding cam surfaces on the adjacent ends of the sleeves 80.

Said cam members are yieldingly maintained in separated position by the spring 85 with the shoe in brake releasing position. Upon the brake lever being actuated the shaft 79 is partially rotated, which rotates the sleeves 80 so that the cam faces thereon operate upon the cam members to force them toward each other against the tension of the spring 85 for drawing the brake shoe into brake engaging position.

Figure 12:
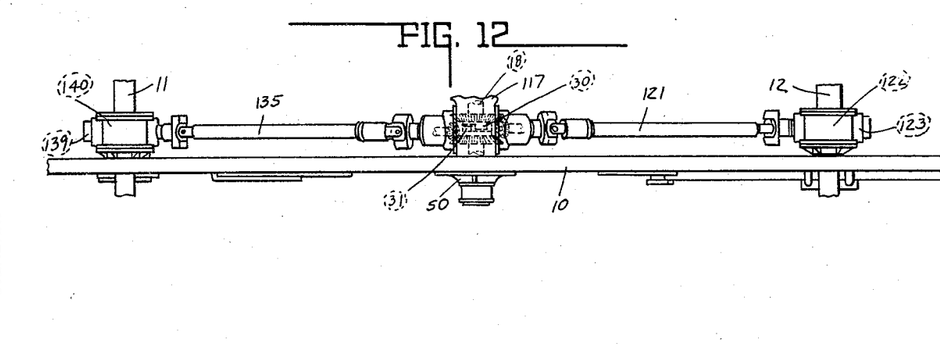
Fig. 12 is a plan view of a portion of the truck showing a modified form of drive having driving shafts.
Figure 13:
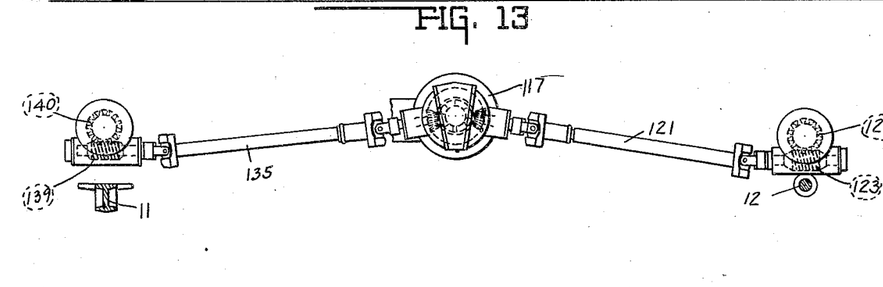
Fig. 13 is the same as Fig. 12 showing a side elevation thereof.

As shown in Figs. 12 and 13, the drive shafts 121 and 135 are employed in place of the sprocket chains 21 and 35, respectively. The drive shaft 121 is adapted to drive the worm gear 122 through the worm 123 which drives the wheel 14 through the shaft 23 in the manner above described and as illustrated in Fig. 4, the only difference being in that the worm gear 122 is substituted for the sprocket 22 shown therein. In like manner, the drive shaft 135 drives the front wheel 13 in the same manner as above described, excepting that there is provided on the driving end of said shaft a worm 139 which drives the worm gear 140 in place of the sprocket 40, above described. The driven end of the rear shaft 121 is driven by the usual bevel gear drive from the shaft 18, the bevel driving gear taking the place of the sprocket 20. The bevel gear driving the rear shaft is provided with the lugs 30 for driving corresponding lugs 31 on the bevel gear that drives the front shaft 135 corresponding to the sprocket 32, as above described with respect to the chain drive.

The invention claimed is:

1. In a four-wheel drive self-propelled vehicle, the combination of a pair of front driving wheels and rear driving wheels, of a power unit for driving the same, means for normally driving the rear wheels, and means adapted to interlock with the driving means therefor for driving the front wheels upon the rotation of the rear wheels exceeding the rotation of the front wheels and release the driving action of the front wheels upon both pairs of wheels regaining their normal relative speed of rotation and position.

2. In a four-wheel drive self-propelled vehicle, the combination with a pair of front driving wheels and rear driving wheels, of a power unit for driving the same, a drive shaft driven by said power unit, a driving member operated by said shaft for driving one pair of wheels, a second driving member loosely mounted on said shaft for driving the other wheels, and inter-engaging lugs on said members adapted to remain in spaced relation during the normal driving action and brought into engagement for causing the first mentioned member to drive the loosely mounted member upon a variation in traction of the wheels, whereby all of said wheels will be driven from said power unit.

3. In a four-wheel drive self-propelled vehicle, the combination of a pair of front driving wheels and rear driving wheels, of a power unit for driving the same, a driving shaft driven by said power unit, a driving member keyed to said shaft for driving the rear wheels, a second driving member loosely mounted on said shaft operatively connected with the front wheels, and inter-engaging lugs on said members adapted to remain in spaced relation during the relative rotation thereof when the traction and the corresponding rotation of said front and rear wheels remain substantially constant and engage with each other so that said second member will be driven by said shaft for driving said front wheels upon a substantial variation in the traction and relative rotation between said front and rear wheels, whereby said front wheels will drive said vehicle upon failure of the rear wheels.

4. In a four-wheel drive self-propelled vehicle, the combination with a frame, and a pair of front driving wheels and rear driving wheels mounted adjacent the opposite ends thereof, of a differential gearing mounted substantially at the center of said frame, means for driving said differential gearing, jack shafts connected therewith and extending from opposite sides thereof, driving members operated by said jack shafts for driving one pair of wheels, driving members loosely mounted on said jack shafts for driving the other pair of wheels, and inter-engaging lugs mounted on said members adapted to remain in spaced relation during the normal operation of the vehicle, and inter-engaging so as to exert a driving action on all wheels upon failure of the driving traction by the wheels driven by said first mentioned members.

5. In a four-wheel drive self-propelled vehicle, the combination with a pair of front driving wheels and rear driving wheels, of a power unit positioned intermediate said front and rear wheels for driving the same, and means associated with said power unit and driven thereby for normally driving one pair of wheels while the other wheels idle and intermittently driving said other wheels in connection with the normally driven wheels upon the rotation thereof being greater than said other wheels in the normal operation of said vehicle.

In witness whereof I have hereunto affixed my signature.

HENRY M. KINGSLEY.